US008252730B2

(12) United States Patent
Hartshorne et al.

(10) Patent No.: US 8,252,730 B2
(45) Date of Patent: Aug. 28, 2012

(54) WELLBORE TREATMENT FLUID (75) Inventors: Robert Seth Hartshorne, Newmarket (GB); Trevor Lloyd Hughes, Cambridge (GB); Timothy Gareth John Jones, Cottenham (GB); Gary John Tustin, Sawston (GB); James Francis Westwood, Betchworth (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 142 days.

(21) Appl. No.: 12/526,817

(22) PCT Filed: Feb. 19, 2008

(86) PCT No.: PCT/GB2008/000564
§ 371 (c)(1),
(2), (4) Date: Feb. 26, 2010

(87) PCT Pub. No.: WO2008/102122
PCT Pub. Date: Aug. 28, 2008

(65) Prior Publication Data
US 2010/0152068 A1 Jun. 17, 2010

(30) Foreign Application Priority Data
Feb. 23, 2007 (GB) .................................... 073544.7

(51) Int. Cl.
*C09K 8/035* (2006.01)
*C09K 8/54* (2006.01)
*C09K 8/68* (2006.01)

(52) U.S. Cl. ........ 507/244; 507/131; 507/138; 507/260; 507/265; 507/267; 166/308.2

(58) Field of Classification Search ........................ None
See application file for complete search history.

(56) References Cited

U.S. PATENT DOCUMENTS

| 2,259,875 A | 10/1941 | Bent et al. |
| 2,265,962 A | 12/1941 | Bent et al. |
| 2,353,830 A | 7/1944 | Kaufman et al. |
| 2,581,132 A | 1/1952 | Nelson et al. |
| 2,596,844 A | 5/1952 | Clark |
| 2,655,480 A | 10/1953 | Spitzer et al. |
| 3,410,343 A * | 11/1968 | Abdo ............................ 166/401 |
| 4,183,757 A | 1/1980 | Groszek et al. |
| 5,551,516 A | 9/1996 | Norman et al. |

(Continued)

FOREIGN PATENT DOCUMENTS
EP 0079997 A1 6/1983
(Continued)

OTHER PUBLICATIONS

Barnes et al: "Methods of measurement, An introduction to rheology," Elsevier, Amsterdam, 1989, pp. 51-54.
(Continued)

*Primary Examiner* — John J Figueroa (57) ABSTRACT

A water-based wellbore treatment fluid contains: one or more viscoelastic-gelling carboxylic acids and/or alkali metal salts thereof; and one or more solubilizing alkylolamines. The carboxylic acids and/or alkali metal salts and the alkylolamines are present in the fluid in respective amounts such that, at 25° C., the alkylolamines solubilize a sufficient portion of the carboxylic acids and/or alkali metal salts to render the fluid viscoelastic. A remaining portion of the carboxylic acids and/or alkali metal salts forms a suspension of solid particulates in the fluid.

12 Claims, 7 Drawing Sheets

U.S. PATENT DOCUMENTS

| | | | |
|---|---|---|---|
| 5,593,954 | A | 1/1997 | Malchow, Jr. |
| 5,707,940 | A | 1/1998 | Bush et al. |
| 5,964,295 | A | 10/1999 | Brown et al. |
| 6,194,356 | B1 | 2/2001 | Jones et al. |
| 6,232,274 | B1 | 5/2001 | Hughes et al. |
| 6,239,183 | B1 | 5/2001 | Farmer et al. |
| 6,450,260 | B1 * | 9/2002 | James et al. .................. 166/277 |
| 6,491,099 | B1 | 12/2002 | Di Lullo Arias et al. |
| 6,506,710 | B1 | 1/2003 | Hoey et al. |
| 7,156,177 | B2 | 1/2007 | Jones et al. |
| 2002/0189810 | A1 | 12/2002 | DiLullo et al. |
| 2003/0017953 | A1 | 1/2003 | Horton et al. |
| 2004/0063587 | A1 | 4/2004 | Horton et al. |
| 2006/0211775 | A1 | 9/2006 | Crews |
| 2007/0213232 | A1 | 9/2007 | Hartshorne et al. |

FOREIGN PATENT DOCUMENTS

| | | |
|---|---|---|
| EP | 0399767 A3 | 11/1990 |
| GB | 1100051 | 1/1968 |
| GB | 1318241 | 5/1973 |
| GB | 2282386 A | 4/1995 |
| GB | 2343189 A | 5/2000 |
| GB | 2371316 A | 7/2002 |
| GB | 2372058 A | 8/2002 |
| GB | 2372518 A | 8/2002 |
| GB | 2372518 B | 4/2003 |
| GB | 2372058 B | 1/2004 |
| GB | 2406864 A | 4/2005 |
| GB | 2408506 A | 6/2005 |
| WO | WO 9856497 A1 * | 12/1998 |
| WO | 9950530 A1 | 10/1999 |
| WO | 0212673 A1 | 2/2002 |
| WO | 02064946 A1 | 8/2002 |
| WO | 2004018586 A1 | 3/2004 |

OTHER PUBLICATIONS

Bockisch: "Fats and oils handbook," American Oil Chemical Society Press, Champaign, Illinois, 1998, p. 804.

Firestone: "Physical and chemical characteristics of oils, fats and waxes," AOCS Press, Washington, 1999, pp. 1-152.

Gregory et al: "Carbon dioxide scrubbing by amine solutions," Industrial and Engineering Chemistry, vol. 29, No. 5, 1937, pp. 514-519.

Koganei: "On fatty acids obtained from cephalin. Compounds of β-aminoethyl alcohol with saturated and unsaturated fatty acids," Journal of Biochemistry, vol. 3, 1923, pp. 15-26.

Laughlin: "The aqueous phase behavior of surfactants," Academic Press, London, 1994, pp. 106-117 (section 5.4).

McBain et al: "A phase rule study of the system sodium stearate-water," Journal of Physical Chemistry, vol. 44, 1940, pp. 1013-1024.

Musial et al: "Preliminary assessment of alginic acid as a factor buffering triethanolamine interacting with artificial skin sebum," European Journal of Pharmaceutics and Biopharmaceutics, vol. 55, issue 2, 2003, pp. 237-240.

Navarrete et al: "Characteristics of viscoelastic surfactant systems in drill-in and completion fluids", Chemistry in the Oil Industry VIII Symposium, Manchester, Nov. 2003, pp. 261-273.

Trusler: "Ethanolamine soaps," Industrial and Engineering Chemistry, vol. 21, 1929, pp. 685-687.

* cited by examiner

3% STEARIC ACID+0.64% ETHANOLAMINE

WELLBORE TREATMENT FLUID

FIELD OF THE INVENTION

This invention relates to water-based wellbore treatment fluids and uses thereof.

BACKGROUND OF THE INVENTION

Surfactants that are capable of developing viscoelasticity in aqueous solutions are of interest for a variety of wellbore fluids, such as fracturing fluids (see e.g. U.S. Pat. Nos. 5,551,516 and 6,232,274), selective fluids for water control (WO 99/50530 and U.S. Pat. No. 6,194,356), drilling fluids (Navarrete, R. C. and Wei, Z., *Characteristics of viscoelastic surfactant systems in drill-in and completion fluids*, Chemistry in the Oil Industry VIII Symposium, Manchester, November 2003, pp. 261-273) and the selective placement of treatment fluids, such as a scale dissolver (WO 02/12673 and U.S. Pat. No. 7,156,177).

A wide range of viscoelastic surfactant solutions have been developed and formulated, with ionic headgroups including quaternary amines (U.S. Pat. No. 5,964,295), amide and ester carboxylates (GB-A-2372058 and WO 02/064946) and amidesulphonates (GB-A-2408506). Dimer and oligomer surfactants have also been described (GB-A-2371316) and have been shown to produce minimal emulsions when their aqueous solutions are mixed with hydrocarbons. Viscoelastic surfactants have also been produced in a dry powder form as a convenient form of delivery (GB-A-2372518).

The reaction between ethanolamines and fatty acids was first reported in Koganei, R., *On fatty acids obtained from cephalin. Compounds of β-aminoethyl alcohol with saturated and unsaturated fatty acids*, J. Biochem., 3, 15-26 (1923). Since then, the surfactants formed by the neutralisation reaction between fatty acids, particularly stearic, oleic and palmitic acids, and ethanolamine bases, have been used in a variety of personal care products. Typical examples are aerosol shaving foams (U.S. Pat. No. 2,655,480), creams (GB-A-2282386), soaps (Trusler, R. B., *Ethanolamine soaps*, Ind. Eng. Chem., 21, 685-687 (1929)) and skin cleansers (GB-A-2343189). The reaction of triethanolamine with the fatty acids found in human skin sebum to form a soap for cleansing and acne prevention has recently been evaluated (Musial, W. and Kubis, A., *Preliminary assessment of alginic acid as a factor buffering triethanolamine interacting with artificial skin sebum*, Eur. J. Pharmaceutics Biophamaceutics, 55, 237-240 (2003)).

Ethanolamine stearates have been used in a variety of industrial applications. U.S. Pat. No. 2,353,830 describes an air pump lubricant that consists of an oil-in-water emulsion stabilised with triethanolamine stearate and free stearic acid. U.S. Pat. No. 2,581,132 describes a lubricating oil consisting of a water-in-oil emulsion, a substituted glyoxalidine and the alkylolamine salt of a fatty acid, such as stearic acid. The fatty acid salts of ethanolamines have been described as wax crystal modifiers in fuel oils (GB 1318241) and as emulsifiers to enable the application of molten wax dispersed in water to coat underwater surfaces to inhibit corrosion and fouling (U.S. Pat. No. 4,183,757).

Desirably, viscoelasticity should be maintained over a temperature range, e.g. extending from ambient up to 150° C., to match the conditions that wellbore fluids can experience downhole. However, the maximum viscosity of conventional wellbore fluid surfactant solutions is generally attained at ambient temperature and increasing temperatures are usually accompanied by a systematic decrease in viscosity.

The oil industry has used ethanolamines for many years as corrosion inhibitors and scavengers for hydrogen sulphide and carbon dioxide (Gregory, L. B. and Scharmann, W. G., *Carbon dioxide scrubbing by amine solutions*, Ind. Eng. Chem., 29, 514-519 (1937)). The reaction between ethanolamines and acid gases, such as hydrogen sulphide, is well known and they are used in their basic form rather than reacted with fatty acids. The ethanolamine salts of fatty acids have found several applications in wellbore fluids over a number of years. U.S. Pat. No. 2,265,962 describes the use of fatty acids or alkylolamines, such as triamylolamines, or mixtures thereof to disperse solids, such as bentonite and barite, in an oil- or solvent-based drilling fluid containing silicon esters for the purposes of wellbore sealing and stabilisation. U.S. Pat. No. 2,596,844 describes a mixture of the aluminium salt of a fatty acid and the free fatty acid to gel hydrocarbons for their use as fracturing fluids. The addition of water-soluble amines, such as ethanolamine, to the gelled hydrocarbon reduced its viscosity and enabled it to be removed from the fracture. The use of the ethanolamine salts of long-chain carboxylic acids as emulsifiers in water-based drilling fluids has been described in U.S. Pat. Nos. 5,593,954 and 5,707,940. US 2003/0017953 discloses the use of triethanolamine to increase the thermal stability of water-soluble synthetic polymers, such as polyethylene glycols, in wellbore service fluids. WO 2004/018586 describes an oil-soluble condensation product formed between dimer and trimer fatty acids, such as oleic acid dimers and trimers, and diethanolamine for use as a suspending agent in oil-based drilling fluids. The condensation reaction formed an ester when one equivalent of dimer fatty acid and two equivalents of diethanolamine were heated in the temperature range 160-177° C. for 30 to 60 minutes. The condensation reaction products were not ionic and not soluble in water or aqueous solutions.

GB 1100051 describes the use of non-Newtonian solutions of various surfactants in aqueous media for the purposes of extracting oil by pumping the liquid from an injection well to a production well. The aqueous surfactant solutions are described by the general formula $$(X)(A),[(Y)(B)]_a,[(Y)(C)]_b$$

where X is alkali metal, ammonium, amine and alkylolamine ions; A is oleate, palmitate, elaidate and stearate; Y is potassium, sodium and ammonium, B is a halide; and C is hydroxide and carbonate. The subscript a refers to a concentration range 0 to 5 weight percent and the subscript b refers to the concentration sufficient to give a pH value greater than 7. The surfactant (X)(A) was generally maintained at a concentration below 1 weight percent when the concentration of the salt (Y)(B) was high (typically>3 weight percent) to ensure the viscosity of the solution was sufficiently low to allow injection into a porous medium. The viscosities of the surfactant solutions were typically 100 cP at shear rates in the range 1-10 s$^{-1}$ and below about 50 cP at a shear rate of 100 s$^{-1}$ when the temperature was below about 50° C. Further, the viscosities of the surfactant solutions decreased with increasing temperature, particularly at low shear rates. The solutions all exhibited some shear thickening behaviour in the range of shear rates 0.1-15 s$^{-1}$. For use at higher temperatures, saturated fatty acids ((H)(A) in the above notation, with H as hydrogen) were considered more suitable.

U.S. Pat. Nos. 6,239,183 and 6,506,710 describe a viscoelastic surfactant solution for use in wellbore service fluids, such as fracturing fluids, based on non-ionic amidoamine oxides with the general formula:

where $R_1$ is an aliphatic hydrophobe (saturated or unsaturated and branched or straight chain) of 7-30 carbon atoms, $R_5$ is hydrogen or an alkyl (or hydroxyalkyl) group and $R_2$, $R_3$ and $R_4$ are various short chain aliphatic groups. Alkanolamines, such as ethanolamine, were added to the viscoelastic surfactant solutions formed by the non-ionic amidoamine oxide for the purposes of corrosion inhibition. The alkanolamines did not react with the surfactant to form any form of salt. Aqueous viscoelastic surfactant solutions were generated using an alkyl sarcosinate surfactant of the general form:

where $R_1$ is an alkyl chain (saturated or unsaturated) having 12-24 carbon atoms, $R_2$ is hydrogen or a short chain alkyl group and X is a carboxylate, sulphate or sulphonate ionic headgroup. The acid headgroup could be neutralized with monovalent cations, such as sodium, potassium or ammonium, or ethanolamines, such as ethanolamine and triethanolamine.

Definitions

The term "optionally substituted", as used herein, pertains to a parent group which may be unsubstituted or which may be substituted with one or more substitutents. The term "substituent" is used herein in the conventional sense and refers to a chemical moiety which is covalently attached to, or if appropriate, fused to, a parent group. A wide variety of substituents are well known, and methods for their formation and introduction into a variety of parent groups are also well known.

The terms "hydrocarbo" and "hydrocarbyl", when used herein, pertain to compounds and/or groups which have only carbon and hydrogen atoms.

The term "aliphatic", when used herein, pertains to compounds and/or groups which are linear or branched, but not cyclic.

The term "alkyl", as used herein, pertains to a monovalent moiety obtained by removing a hydrogen atom from a carbon atom of a hydrocarbon compound which may be saturated or unsaturated (e.g., partially unsaturated, fully unsaturated).

The term "alkylol", as used herein, pertains to an alkyl group which has one or more hydroxy substituents.

By a "straight chain" we mean a chain of consecutively linked atoms, all of which or the majority of which are carbon atoms. Side chains may branch from the straight chain.

By a "viscoelastic" fluid we mean that the elastic (or storage) modulus G' of the fluid is equal to or greater than the loss modulus G" as measured using an oscillatory shear rheometer (such as a Bohlin CVO 50) at a frequency of 1 Hz. The measurement of these moduli is described in *An Introduction to Rheology*, by H. A. Barnes, J. F. Hutton, and K. Walters, Elsevier, Amsterdam (1997)

SUMMARY OF THE INVENTION

The present invention is at least partly based on the realisation that relatively insoluble carboxylates e.g. unbranched, long chain fatty acids with iodine values less than or equal to 40, such as stearic acid and partially hydrogenated tallow acids, can be sufficiently solubilised at ambient temperatures by alkylolamines, such as ethanolamines, to generate viscoelastic solutions. Typically the surfactant solutions produced are cloudy and viscous at ambient temperatures but clarify and further viscosify on heating, and can reach a maximum in their viscosities above ambient temperatures. The rheological behaviours of the solutions may contrast significantly with those of conventional viscoelastic solutions that are clear at ambient temperature where they exhibit their maximum viscosities.

Thus, in a first aspect, the present invention provides a water-based wellbore treatment fluid containing:
 one or more viscoelastic-gelling carboxylic acids and/or alkali metal salts thereof; and
 one or more solubilising alkylolamines;
 wherein the carboxylic acids and/or alkali metal salts and the alkylolamines are present in the fluid in respective amounts such that, at 25° C., the alkylolamines solubilise a sufficient portion of the carboxylic acids and/or alkali metal salts to render the fluid viscoelastic, a remaining portion of the carboxylic acids and/or alkali metal salts forming a suspension of solid particulates in the fluid.

In the fluid, the dissolved portion of the one or more carboxylic acids and/or alkali metal salts forms carboxylate anions, while the one or more alkylolamines form alkylolammonium cations. Thus the solubisation proceeds by the formation of ionic products.

By using a carboxylic acid and/or alkali metal salt thereof that is only partially solubilised at ambient temperature, it is possible to produce a treatment fluid that has a maximum viscosity at an elevated temperature. Essentially, as the temperature rises, more carboxylate ions enter solution from the suspension of solid particulates. The increase in the number of carboxylate ions produces a rise in viscosity that can more than counteract the reduction in viscosity that is generally associated with temperature increases. Thus the fluid may be particularly suitable for use in, say, the relatively high temperature environment of a producing oil well.

Advantageously, the relatively low solubility carboxylic acids of the wellbore treatment fluid are typically significantly cheaper than the more soluble surfactants described in e.g. GB-A-2372058, WO 02/064946 and WO 02/12673. For example, it is possible to use low purity fatty acid mixtures such as tallow acids or tall oil fatty acids in the fluid.

Preferably, the carboxylic acids have the formula $R_1COOH$, where $R_1$ is an optionally substituted (but preferably unsubstituted) aliphatic alkyl group. $R_1$ may be saturated. $R_1$ may be an unbranched straight chain. $R_1$ may have from 15 to 21 carbon atoms.

Preferably, the fluid contains at least 30 g/l of the one or more carboxylic acids and/or alkali metal salts.

The or each of the carboxylic acids and/or alkali metal salts may have a Krafft temperature of at least 25° C.

The one or more carboxylic acids and/or alkali metal salts may have an iodine value of 40 or less. When there is a mixture of carboxylic acids and/or alkali metal salts thereof in the fluid, the iodine value is for that mixture.

Preferably, the or each alkylolamine has the formula $R_2R_3R_4N$ or $R_5R_6NR_9NR_7R_8$, where:
 at least one of $R_2$, $R_3$ and $R_4$, at least one of $R_5$ and $R_6$ and at least one of $R_7$ and $R_8$ is an optionally substituted (but preferably unsubstituted, and preferably saturated) aliphatic alkylol group and the others of $R_2$, $R_3$, $R_4$, $R_5$, $R_6$, $R_7$ and $R_8$ are optionally substituted (but preferably unsubstituted, and preferably saturated) aliphatic alkyl groups or hydrogen, and $R_9$ is a covalent bond, an optionally substituted (but preferably unsubstituted) —$CH_2$— group, or an optionally substituted (but preferably unsubstituted) —$CH_2$—$CH_2$— group. Each of $R_2$, $R_3$, $R_4$, $R_5$, $R_6$, $R_7$ and $R_8$ may have up to four carbon atoms.

The fluid may contain at least 1 g/l of the alkylolamines.

Preferably, the water-based wellbore treatment fluid further contains one or more water-soluble inorganic alkali metal salts. The inorganic alkali metal salts may be selected from the group consisting of sodium hydroxide, sodium carbonate, potassium hydroxide and potassium carbonate (potassium carbonate being preferred). The fluid may contain at least 40 g/l of the inorganic alkali metal salts.

Preferably, the viscosity of the fluid increases with increasing temperature from 25° C. The fluid may have a maximum viscosity in a temperature range of from 50° C. to 80° C.

In a further aspect, the present invention provides for the use of the treatment fluid of the first aspect in a wellbore. For example, the treatment fluid may be used as a fracturing fluid, as a water loss control fluid, as a drilling fluid, or as a placement fluid for the selective placement of agents such as scale dissolver.

In a further aspect, the present invention provides a method of treating a subterranean formation of a hydrocarbon well comprising:

providing the treatment fluid of the first aspect; and
injecting the treatment fluid into the well.

BRIEF DESCRIPTION OF THE DRAWINGS

Specific embodiments of the present invention will now be described with reference to the following drawings in which.

DETAILED DESCRIPTION

The hydrophobes of surfactants whose aqueous solutions are able to generate viscoelastic solutions generally consist of an aliphatic hydrocarbon chain having 16 or more carbon atoms and either some degree of branching on the chain (e.g. isostearic acid or dimer oleic acids) or some degree of unsaturation (e.g. oleic or erucic acids). Branching and unsaturation in the hydrophobe lower the Krafft temperature (Laughlin, R. G., *The Aqueous Phase Behavior of Surfactants*, pp. 106-117, Academic Press, London (1994)) of the surfactant such that it can form a viscoelastic solution at ambient temperatures on the addition of electrolytes. For example, the Krafft temperature of the sodium salt of oleic acid, an unsaturated fatty acid, is 22° C. while the sodium salt of the saturated stearic (octadecanoic) acid is 67° C. (McBain, J. W., Vold, R. D. and Frick, M., *A phase rule study of the system sodium stearate-water*, J. Phys. Chem., 44, 1013-1024 (1940)). The Krafft temperature of a surfactant is also determined by the hydrocarbon chain length of the hydrophobe and the counterion of the ionic headgroup of the surfactant. In comparison with the above surfactants, the Krafft temperatures of sodium palmitate (hexadecanoate) and potassium stearate are 62° C. and 48° C., respectively. In a further comparison, the Krafft temperature of potassium oleate is 15° C., which is low enough for this surfactant to be able to form a viscoelastic surfactant at ambient temperature.

The most common sources of the hydrophobes used to form viscoelastic surfactants are the naturally occurring fatty acids, which for these purposes range from $C_{16}$ to $C_{22}$. The use of high purity, unsaturated fatty acids, such as oleic and erucic acids, in the manufacture of surfactants can result in high costs as fractionation is required from the other fatty acids occurring upon hydrolysis of the source glycerides. Alternatively, a mixture of fatty acids, both saturated and unsaturated, can be used as the hydrophobe source. Examples are tallow fatty acids, derived from animal tallow (beef fat render), and tall oil fatty acids (so-called TOFA) released from wood during the Kraft paper-making process. The fatty acid content of a large number of oils derived from both animal and vegetable sources is readily available (Firestone, D., *Physical and Chemical Characteristics of Oils, Fats and Waxes*, AOCS Press, Washington (1999)). A convenient measure of the degree of unsaturation of a mixture of fatty acids is the iodine value, usually abbreviated to IV (Bockish, M., *Fats and Oils Handbook*, p. 804, American Oil Chemical Society Press, Champaign Ill. (1993)). Unsaturated pure fatty acids, such as oleic and linoleic acids, are characterised by IV values of in excess of 90, while fully saturated pure fatty acids, such as palmitic and stearic acids, have an IV of approximately unity. Generally, anionic surfactants synthesised from fatty acids with an IV less than about 40 and neutralised with alkali metal ions are, of themselves, insoluble or only slightly soluble in water at ambient temperature and thus have difficulty forming viscoelastic solutions.

However, when the problem of solubility at ambient temperatures is overcome, as in the present invention, the use of fatty acids characterised by IV≦40 as the raw materials for surfactants has some significant advantages. Firstly, fatty acids with low IV are generally cheaper than more unsaturated acids. Commonly, low IV fatty acids occur as a natural distribution in vegetable oils and animal fats after removal of unsaturated derivatives. Secondly, the temperatures over which the surfactant exhibits viscoelasticity can be increased to cover some of the more extreme operating conditions encountered downhole.

Alkylolamines, for example ethanolamines, can react with fatty acids to yield salts that can exhibit surfactant behaviour. The reaction between an ethanolamine and a fatty acid can be described by:

$R_1CO_2H + R_3R_4NCH_2CH_2OH \leftrightarrow R_3R_4HN^+CH_2CH_2OH + R_1CO_2^-$ where $R_1$ is an alkyl group that will be described in more detail below. The groups $R_2$ and $R_3$ on the ethanolamine can be hydrogen or short-chain alkyl groups (e.g. groups having up to four carbon atoms) or additional —$CH_2CH_2OH$ groups. Thus $R_2$=$R_3$=—$CH_2CH_2OH$ yields triethanolamine, while $R_2$=$R_3$=H yields ethanolamine. Other common ethanolamines are N-methylethanolamine with $R_2$=H and $R_3$=—$CH_3$ and N,N-dimethylethanolamine with $R_2$=$R_3$=—$CH_3$. Some other alkylolamines, including dialkylolamines, are:

triisopropanolamine

N,N'-bis(2-hydroxyethyl)-ethylenediamine

N,N,N',N'-tetrakis(2-hydroxypropyl)-ethylenediamine

A large number of alkylolamines are commercially available. For example, N,N,N',N'-tetrakis(2-hydroxypropyl)-ethylenediamine is available from BASF as Quadrol™.

The alkyl group $R_1$ is typically a straight-chain hydrocarbon with a level of unsaturation that preferably corresponds to an iodine value (IV) of less than 40. The hydrocarbon chain length is preferably C16 or greater, and can consist of a naturally occurring distribution of linear hydrocarbons predominantly in the range C16 to C22. The fatty acid $R_1CO_2H$ can be a pure acid, such as palmitic (hexadecanoic) or stearic (octadecanoic) acid, or a partially hydrogenated fatty acid, such as tallow acid T11 (available from Procter and Gamble) which consists of carboxylic acids with a range of aliphatic hydrocarbon chains, typically: C12 (1%), C14 (3%), C16 (26%), unsaturated C16 (2%), C17 (2%), C18 (25%) and unsaturated C18 (41%) and has an IV of 34-42. Alternatively the fatty acid can be the tallow acid T1 (also available from Procter and Gamble) which is a fully hydrogenated fatty acid, typically consisting of ≦C15. (3%), C16 (38%), C18 (58%) and ≧C20 (1%) and characterised by an IV of no more than 1. The fatty acid can also be a fully hydrogenated fatty acid from a vegetable source, such as V1 from Procter and Gamble.

A number of examples are now presented to illustrate the formulation of viscoelastic surfactant solutions with the alkylolamine salts of fatty acids for use at elevated temperatures.

EXAMPLE 1

Stearic acid+ethanolamine

Figure 1:
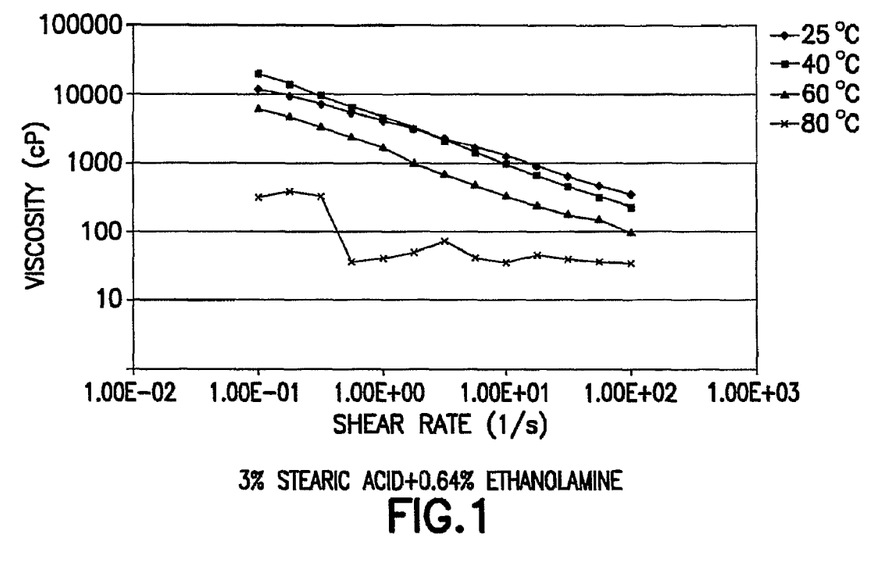
FIG. 1 shows the shear viscosity of a suspension based on stearic acid and ethanolamine for shear rates in the range from 0.1 $s^{-1}$ to 100 $s^{-1}$ at temperatures from 25 to 80° C.

The surfactant ethanolamine stearate was produced by mixing 30 grams of stearic acid (99%) with 6.4 grams of ethanolamine in 800 ml of deionised water to generate a cloudy, viscoelastic suspension. Further water was added to make one litre of the suspension and excess ethanolamine was added to raise its pH to a value of 9.0. FIG. 1 shows the shear viscosity of the ethanolamine stearate suspension for shear rates in the range from $0.1\ s^{-1}$ to $100\ s^{-1}$ at temperatures from 25 to 80° C. The viscosity increased with increasing temperature at low shear rate for modest increases in temperature and then decreased with further increases in the temperature. The ethanolamine stearate fully dissolved on heating to form a clear gel that became cloudy again on cooling.

Figure 2:
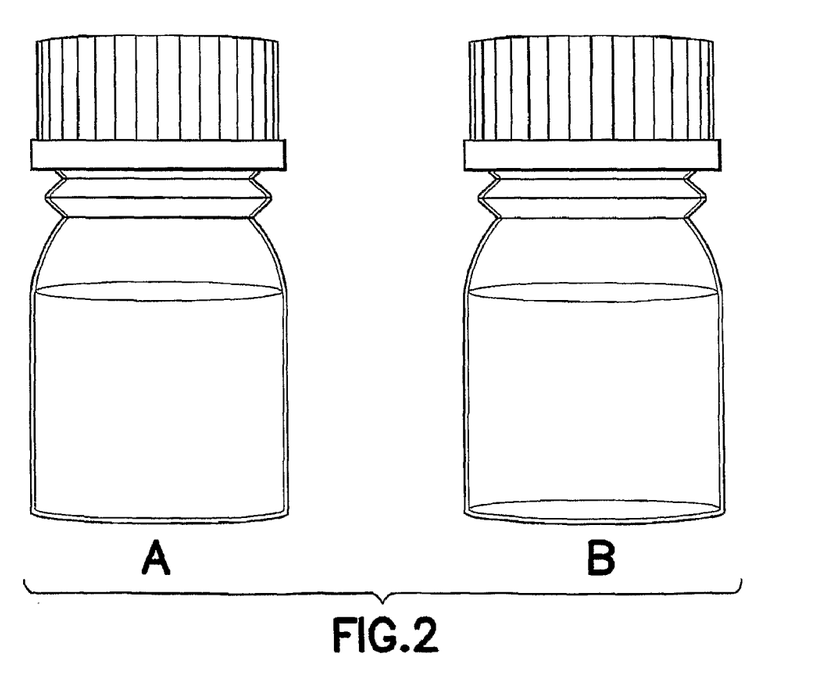
FIG. 2 shows the suspension of FIG. 1 on the left as a cloudy viscoelastic suspension at ambient temperature and on the right as a clear viscoelastic solution at 65° C.

FIG. 2 shows a comparison of the ethanolamine stearate surfactant as a cloudy viscoelastic suspension at ambient temperature and as a clear viscoelastic solution at 65° C. Clearly, a portion of the stearic acid formed a suspension of solid particulates in the fluid at ambient temperature, and this portion then dissolved as ethanolamine stearate at 65° C.

EXAMPLE 2

Behenic acid+ethanolamine

Figure 3:
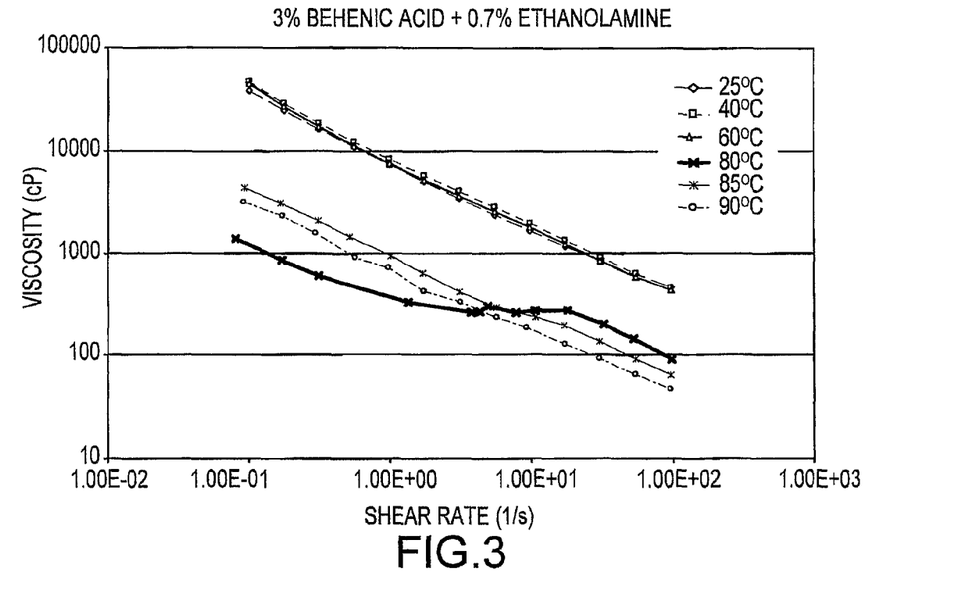
FIG. 3 shows the shear viscosity of a suspension based on behenic acid and ethanolamine for shear rates in the range from 0.1 $s^{-1}$ to 100 $s^{-1}$ at temperatures from 25 to 90° C.

Behenic acid (30 grams) was reacted at ambient temperature with ethanolamine (7 grams) in sufficient water to form one litre of a viscoelastic, cloudy suspension. FIG. 3 shows the shear viscosity of the ethanolamine behenate suspension for shear rates in the range from $0.1\ s^{-1}$ to $100\ s^{-1}$ at temperatures from 25 to 90° C. The shear viscosity of the ethanolamine behenate suspension was essentially independent of temperature over the range 25-60° C., but above this temperature the viscosity generally began to decrease. The surfactant suspension substantially clarified at elevated temperatures as the ethanolamine behenate progressively dissolved.

EXAMPLE 3

Stearic acid+diethanolamine

Figure 4:
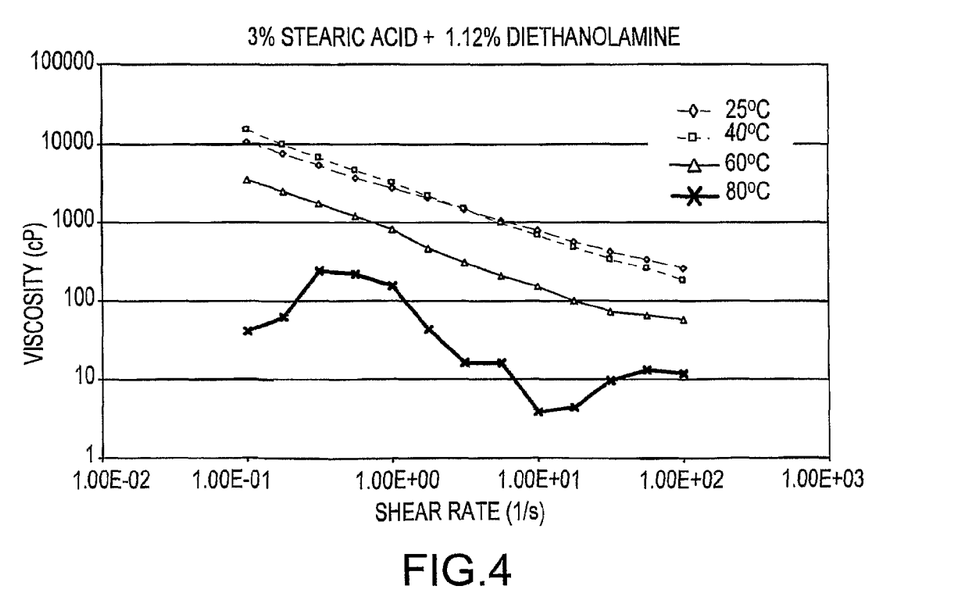
FIG. 4 shows the shear viscosity of a suspension based on stearic acid and diethanolamine for shear rates in the range from 0.1 $s^{-1}$ to 100 $s^{-1}$ at temperatures from 25 to 80° C.

An aqueous, viscoelastic suspension of diethanolamine stearate was prepared at ambient temperature by reacting 30 grams of stearic acid with 11.2 grams of diethanolamine in sufficient water to yield one litre of product. FIG. 4 shows the shear viscosity of the diethanolamine stearate suspension for shear rates in the range from 0.1 s$^{-1}$ to 100 s$^{-1}$ at temperatures from 25 to 80° C. The suspension clarified on heating as the diethanolamine stearate progressively dissolved. The surfactant solution yielded a viscosity in excess of 75 cP at a shear rate of 100 s$^{-1}$ when the temperature was 60° C. or lower.

EXAMPLE 4

Behenic acid+triethanolamine

Figure 5:
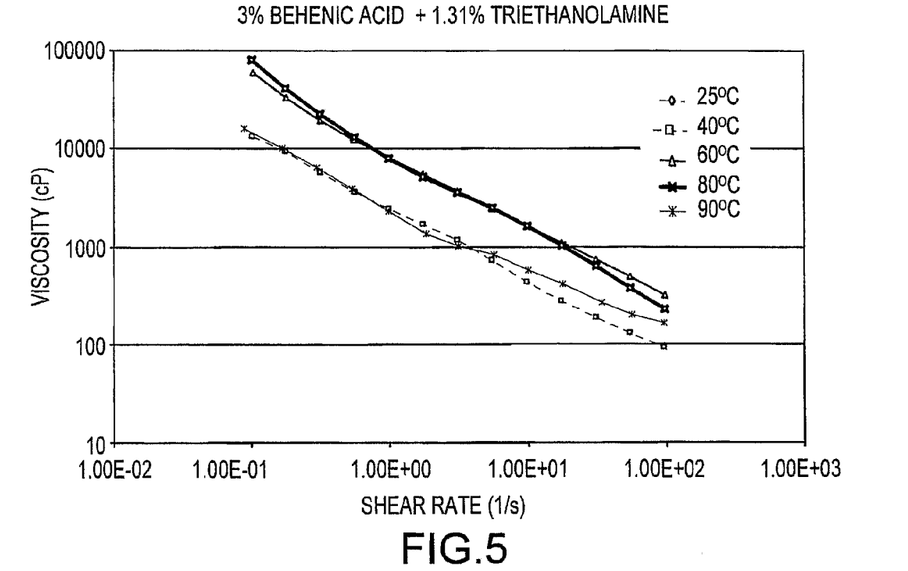
FIG. 5 shows the shear viscosity of a suspension based on behenic acid and triethanolamine for shear rates in the range from 0.1 $s^{-1}$ to 100 $s^{-1}$ at temperatures from 25 to 90° C.

FIG. 5 shows the shear viscosity of an aqueous suspension of the surfactant triethanolamine behenate for shear rates in the range from 0.1 s$^{-1}$ to 100 s$^{-1}$ at temperatures from 25 to 90° C. The surfactant was formed by adding 30 grams of behenic acid and 13.1 grams of triethanolamine to sufficient water to generate one litre of a viscoleastic suspension. As the temperature increased, the viscosity of the solution initially decreased, then increased and finally decreased again. The surfactant suspension clarified on heating as the surfactant progressively dissolved in the water.

EXAMPLE 5

Tallow Acid+Ethanolamine+Potassium Carbonate

Figure 6:
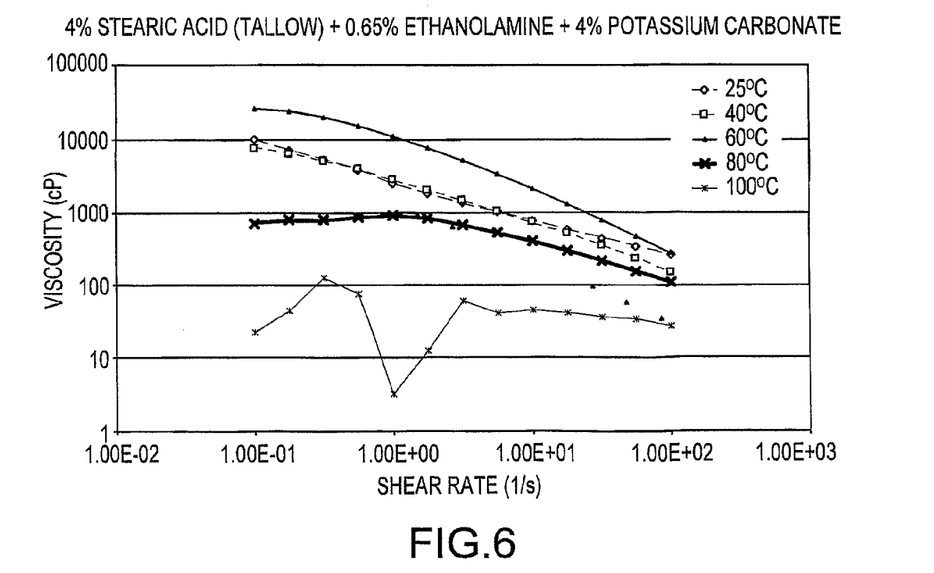
FIG. 6 shows the shear viscosity of a suspension based on tallow acid, ethanolamine and potassium carbonate for shear rates in the range from 0.1 $s^{-1}$ to 100 $s^{-1}$ at temperatures from 25 to 100° C.

A mixed ethanolamine-potassium viscoelastic surfactant suspension was generated by adding 40 grams of tallow acid (product T1 from Procter and Gamble) to 6.5 grams of ethanolamine and 40 grams of potassium carbonate in sufficient water to yield one litre of product. FIG. 6 shows the shear viscosity of the surfactant suspension for shear rates in the range from 0.1 s$^{-1}$ to 100 s$^{-1}$ at temperatures from 25 to 100° C. The viscosity of the suspension increased on heating up to 60° C. as the surfactant dissolved in the water to form a clear solution. A further increase in the temperature of the surfactant solution resulted in a decrease in the viscosity of the clear surfactant solution and an approach to Newtonian rheology.

FIG. 6. Vegetable-Based Stearic Acid+Ethanolamine+Potassium Carbonate

Figure 7:
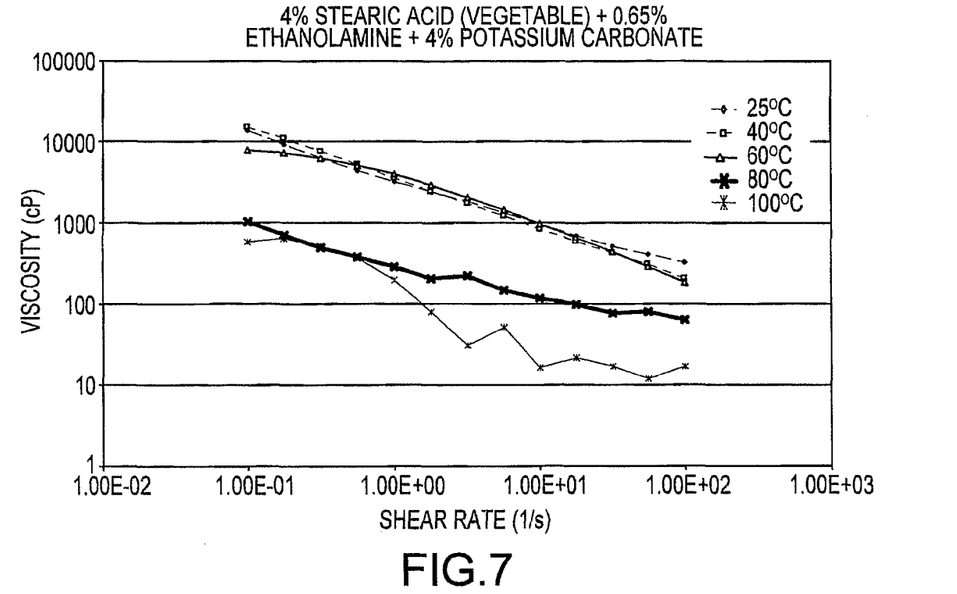
FIG. 7 shows the shear viscosity of a suspension based on vegetable-derived stearic acid, ethanolamine and potassium carbonate for shear rates in the range from 0.1 $s^{-1}$ to 100 $s^{-1}$ at temperatures from 25 to 100° C.

An ethanolamine-potassium viscoelastic surfactant suspension was generated by reacting 40 grams of a vegetable-based stearic acid (product V-1 from Procter and Gamble) with 6.5 grams of ethanolamine and 40 grams of potassium carbonate in sufficient water to form one litre of the suspension. FIG. 7 shows the shear viscosity of the suspension for shear rates in the range from 0.1 s$^{-1}$ to 100 s$^{-1}$ at temperatures from 25 to 100° C. The viscosity of the surfactant suspension showed little dependence on temperature up to 60° C., but decreased with further increases in the temperature. A viscosity of 80 cP at a shear rate of 100 s$^{-1}$ was achieved at a temperature of 80° C.

EXAMPLE 7

Stearic Acid+Ethanolamine+Potassium Carbonate

Figure 8:
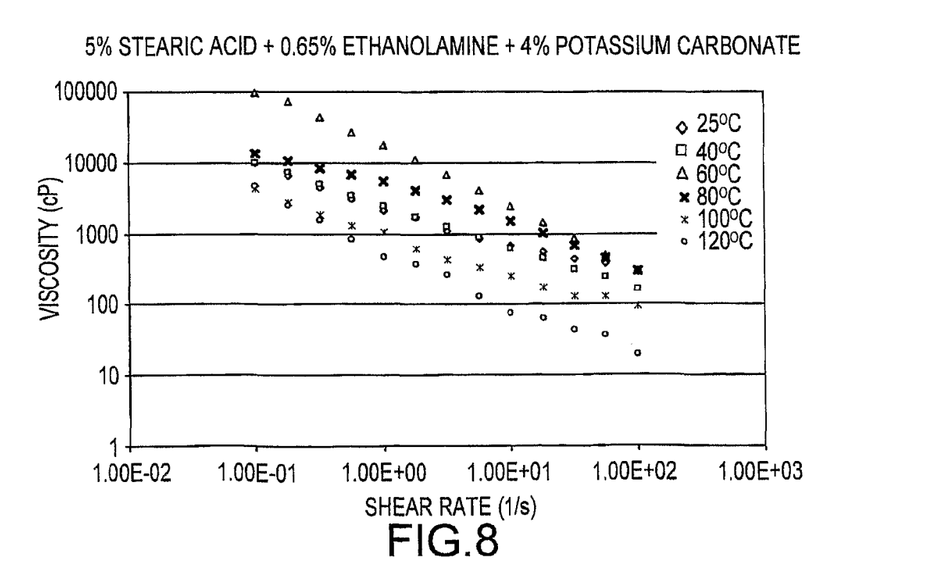
FIG. 8 shows the shear viscosity of a suspension based on stearic acid, ethanolamine and potassium carbonate for shear rates in the range from 0.1 $s^{-1}$ to 100 $s^{-1}$ at temperatures from 25 to 120° C.

An ethanolamine-potassium viscoelastic surfactant suspension was generated by reacting 50 grams of stearic acid (95% purity; Sigma-Aldrich Chemicals) with 6.5 grams of ethanolamine and 40 grams of potassium carbonate in sufficient water to form one litre of the suspension. FIG. 8 shows the shear viscosity of the suspension for shear rates in the range from 0.1 s$^{-1}$ to 100 s$^{-1}$ at temperatures from 25 to 120° C. The surfactant suspension clarified on heating to give a clear, viscoelastic solution. At a temperature of 100° C., the surfactant solution achieved a viscosity of 100 cP at a shear rate of 100 s$^{-1}$.

EXAMPLE 8

Stearic and Oleic Acids+Ethanolamine+Potassium Carbonate

Figure 9:
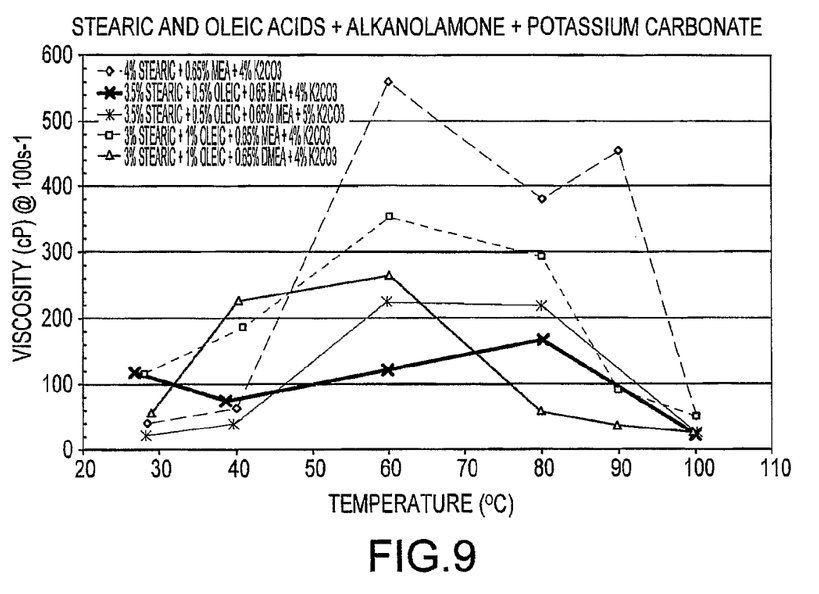
FIG. 9 shows the shear viscosities of five different suspensions for a shear rate of 100 $s^{-1}$ at temperatures from about 25 to 100° C.

Five ethanolamine-potassium or diethanolamine-potassium viscoelastic surfactant suspensions were generated by reacting combinations of stearic and oleic acids with ethanolamine (MEA) or diethanolamine (DMEA) and potassium carbonate in sufficient water to form one litre of each of the suspensions. The five suspension contained respectively (i) 40 grams of stearic acid, 6.5 grams of MEA and 40 grams of potassium carbonate, (ii) 35 grams of stearic acid, 5 grams of oleic acid, 6.5 grams of MEA and 40 grams of potassium carbonate, (iii) 35 grams of stearic acid, 5 grams of oleic acid, 6.5 grams of MEA and 50 grams of potassium carbonate, (iv) 30 grams of stearic acid, 10 grams of oleic acid, 6.5 grams of MEA and 40 grams of potassium carbonate, and (v) 30 grams of stearic acid, 10 grams of oleic acid, 6.5 grams of DMEA and 40 grams of potassium carbonate. FIG. 9 shows the shear viscosities of the suspensions for a shear rate of 100 s$^{-1}$ at temperatures from about 25 to 100° C.

FIG. 9 shows that the viscosity of the suspensions with MEA and DMEA increased with temperature, reaching a maximum in the temperature range 50-80° C., and then decreased with further increases in temperature. The figure also shows that the viscosity of a surfactant suspension at ambient temperature can be controlled by the stearic/oleic acid ratio, noting that higher viscosities at ambient temperature can be achieved by increasing the oleic acid content (and thus the effective IV of the fatty acid mixture). However, the addition of oleic acid to the ethanolamine-fatty acid surfactant system diminished the viscosity of the clarified surfactant solution achieved at elevated temperatures. Further, the addition of higher levels of salt to the surfactant system can reduce the viscosity at all temperatures.

EXAMPLE 9

Behenic Acid+Ethanolamine+Potassium Carbonate

Figure 10:
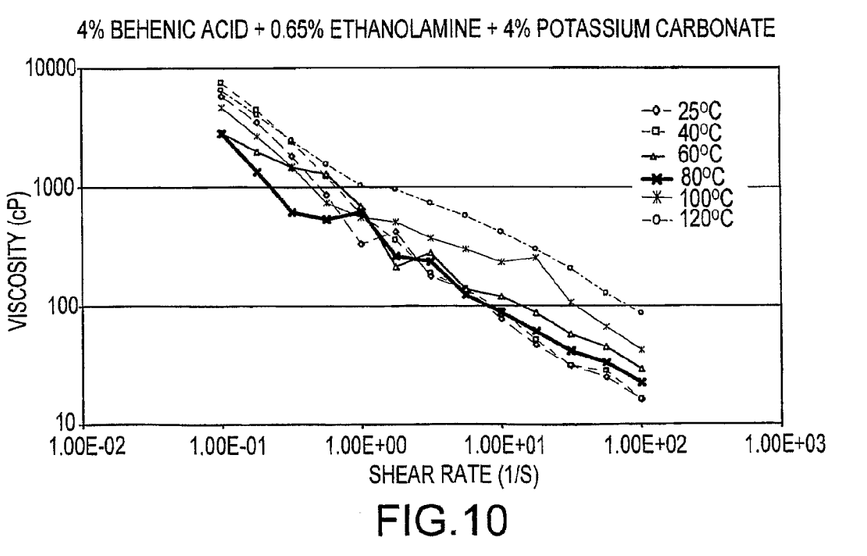
FIG. 10 shows the shear viscosity of a suspension based on behenic acid, ethanolamine and potassium carbonate for shear rates in the range from 0.1 $s^{-1}$ to 100 $s^{-1}$ at temperatures from 25 to 120° C.

A mixed ethanolamine-potassium behenate viscoelastic surfactant system was generated by reacting 40 grams of behenic acid with 6.5 grams of ethanolamine in the presence of 40 grams of potassium carbonate and in sufficient water to form one litre of a viscous, cloudy suspension. FIG. 10 shows the shear viscosity of the suspension for shear rates in the range from 0.1 s$^{-1}$ to 100 s$^{-1}$ at temperatures from 25 to 120° C. The viscosity of the surfactant suspension at shear rates above 1 s$^{-1}$ was substantially independent of temperature up to 80° C., further increases in temperature causing the viscosity to then increase. The surfactant suspension clarified on heating and formed a clear viscoelastic solution. At a temperature of 120° C., the solution generated a viscosity of 90 cP at a shear rate of 100 s$^{-1}$.

EXAMPLE 10

Tallow Acid+Ethanolamine+Potassium Stearate+Potassium Carbonate

Figure 11:
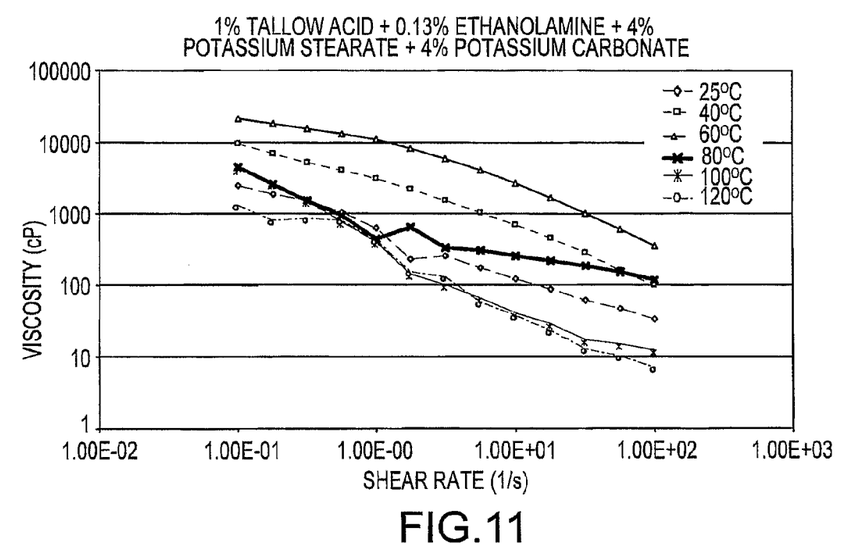
FIG. 11 shows the shear viscosity of a suspension based on tallow acid, ethanolamine, potassium stearate and potassium carbonate for shear rates in the range from 0.1 $s^{-1}$ to 100 $s^{-1}$ at temperatures from 25 to 120° C.

A mixed ethanolamine-potassium carboxylate surfactant system was formulated by reacting 10 grams of tallow acid (product T1 from Procter and Gamble) with 1.3 grams of ethanolamine in sufficient water in the presence of 40 grams of potassium stearate (Norac Inc.) and 40 grams of potassium carbonate to yield one litre of a viscous, cloudy suspension. FIG. 11 shows the shear viscosity of the suspension for shear rates in the range from $0.1\ s^{-1}$ to $100\ s^{-1}$ at temperatures from 25 to 120° C. The viscosity at a given shear rate increased with increasing temperature up to 60° C., whereupon further increases in the temperature caused the viscosity to decrease. The surfactant suspension clarified on heating, yielding a clear viscoelastic solution. At a temperature of 80° C., the surfactant solution generated a viscosity of 105 cP at a shear rate of $100\ s^{-1}$.

EXAMPLE 11

Tallow Acid+Ethanolamine+Sodium Stearate+Potassium Carbonate

Figure 12:
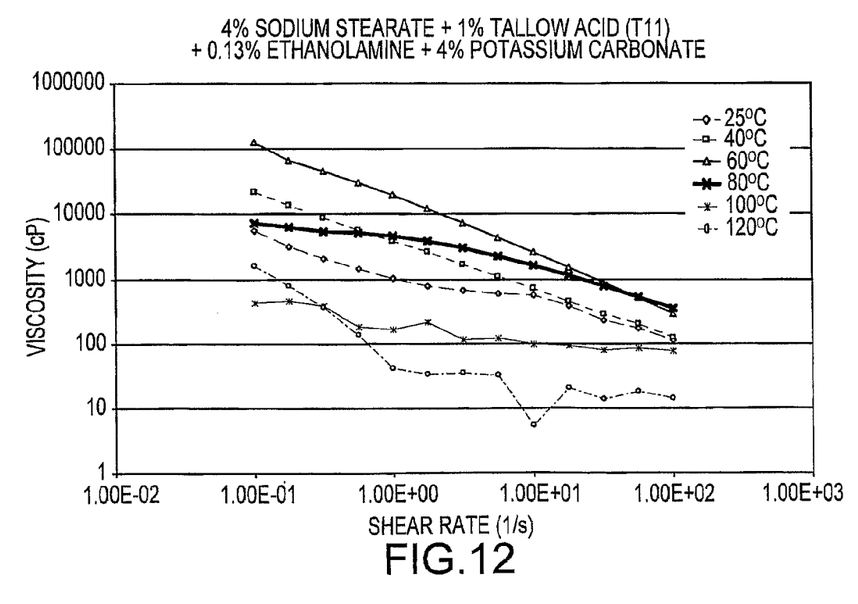
FIG. 12 shows the shear viscosity of a suspension based on tallow acid, ethanolamine, sodium stearate and potassium carbonate for shear rates in the range from 0.1 $s^{-1}$ to 100 $s^{-1}$ at temperatures from 25 to 120° C.

A mixed ethanolamine-potassium-sodium carboxylate viscoelastic surfactant system was formulated by reacting 10 grains of tallow acid (product T11 from Procter and Gamble) with 1.3 grams of ethanolamine in water in the presence of 40 grams of sodium stearate (Norac Inc.) and 40 grams of potassium carbonate. Sufficient water was used to generate one litre of surfactant suspension at ambient temperature. FIG. 12 shows the shear viscosity of the suspension for shear rates in the range from $0.1\ s^{-1}$ to $100\ s^{-1}$ at temperatures from 25 to 120° C. The viscosity increased with increasing temperature up to 60° C., whereupon the viscosity decreased with further increases in the temperature. The surfactant formed a clear, viscoelastic gel on heating. At a temperature of 80° C., the surfactant solution was able to generate a viscosity of 90 cP at a shear rate of $100\ s^{-1}$.

EXAMPLE 12

Tallow Acid+Ethanolamine+Sodium Stearate+Potassium Carbonate+Sodium Carbonate

Figure 13:
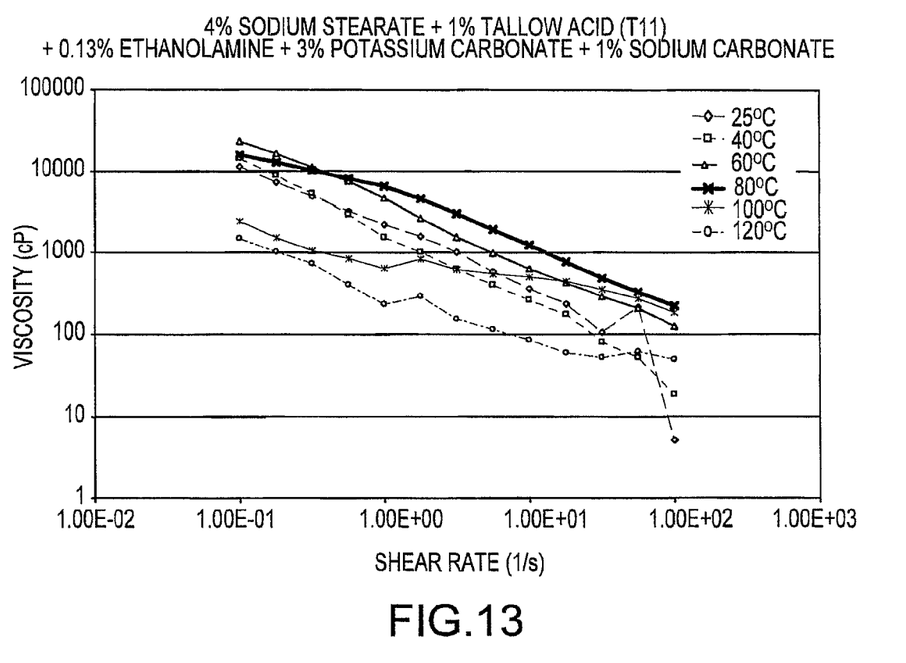
FIG. 13 shows the shear viscosity of a suspension based on tallow acid, ethanolamine, sodium stearate, potassium carbonate and sodium carbonate for shear rates in the range from 0.1 $s^{-1}$ to 100 $s^{-1}$ at temperatures from 25 to 120° C.

A mixed ethanolamine-potassium-sodium carboxylate surfactant system was formulated by reacting 10 grams of tallow acid (product T11 from Procter and Gamble) with 1.3 grams of ethanolamine in water in the presence of 40 grams of sodium stearate (Norac Inc.), 30 grams of potassium carbonate and 10 grams of sodium carbonate. Sufficient water was added to generate one litre of a viscoelastic suspension. FIG. 13 shows the shear viscosity of the suspension for shear rates in the range from $0.1\ s^{-1}$ to $100\ s^{-1}$ at temperatures from 25 to 120° C. The viscosity increased with increasing temperature up to 80° C., and subsequent increases in the temperature resulted in a decrease in viscosity. The surfactant formed a clear, viscoelastic gel on heating. At a temperature of 120° C., the surfactant solution was able to generate a viscosity of 70 cP at a shear rate of $100\ s^{-1}$.

Discussion

Largely saturated fatty acids with IV≦40 (such as palmitic ($C_{16}$) and stearic ($C_{18}$) acids) are generally significantly cheaper than unsaturated acids, such as oleic ($C_{18}$) and erucic ($C_{22}$) acids. Similarly, the potassium and sodium salts of saturated fatty acids, particularly stearic acid, are produced industrially in large quantities and are low cost. Sodium stearate, for example, is a common soap and also finds wide application in the polymer industry. Saturated fatty acids and many of their alkali metal salts are commodities that are readily available from a number of global suppliers. By using such acids in viscoelastic wellbore fluids, the need to custom synthesise surfactants can be avoided, which reduces costs.

The compositions presented herein have some beneficial features for wellbore service fluids. Compositions including alkali metal carbonates are particularly preferred. Such carbonates can be used to neutralise any excess fatty acid not reacted with alkylolamine, thereby avoiding the on-site use of alkali metal hydroxides (with their attendant health and safety issues) for such neutralisation. In addition, using alkali metal carbonates as an electrolyte to viscosify the surfactant solutions results in an excess of carbonate ions in the solutions. This excess is then available to scavenge metal ions, such as calcium or magnesium, whose presence could otherwise result in the precipitation of carboxylate ions. Further, using alkali metal carbonate salt as an electrolyte in place of salts such as alkali metal halides results in an alkaline surfactant solution, generally with pH values typically in excess of 9, which is beneficial both for solution rheology and the reduction of corrosion.

A characteristic feature of most of the surfactant systems described herein is that with increasing temperature their viscosities increase to a maximum value typically around 80° C., followed by a decrease with further increases in temperature. The maximum in viscosity is caused by the progressive dissolution of the surfactant as the temperature exceeds the surfactant's effective Krafft temperature, while above the maximum the surfactant becomes fully dissolved and so further temperature increases result in reduced viscosities. The viscosity maximum at elevated temperatures can be advantageous where high viscosities are required at high temperatures, such as in the treatment (e.g. fracturing) of producing oil wells. Further, the lower viscosities at ambient and moderately elevated temperatures, e.g. 25-60° C., result in reduced power consumption to pump the fluid to the required depth.

When the temperature of the surfactant systems described herein is below the effective Krafft temperature, a substantial fraction of the surfactant exists as a suspended particulate solid phase. The particles may inhibit filtration of the surfactant into permeable rock formations by forming a filter cake. Now, during fluid placement, local wellbore temperatures are often reduced relative to long-term, static wellbore temperatures. Thus the filter cake may be formed at a local temperature which is below the effective Krafft temperature, but when pumping ceases, heat flow from the reservoir can cause the local temperature to rise, dissolving the surfactant particles to remove the filter cake. Thus a possible use for the surfactant systems is for forming temporary barriers in the well.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All the references mentioned herein are incorporated by reference.

The invention claimed is:
1. A method of treating a subterranean formation of a hydrocarbon well comprising
providing a water-based wellbore treatment fluid containing:
at least 30 g/l of one or more viscoelastic-gelling carboxylic acids and/or alkali metal salts thereof, wherein the carboxylic acids have the formula $R_1COOH$, where $R_1$ is an optionally substituted aliphatic alkyl group of 15 to 21 carbon atoms;
at least 1 g/l one or more solubilising alkylolamines; and
at least 40 g/l of one or more water-soluble inorganic alkali metal salts,
wherein the carboxylic acids and/or alkali metal salts thereof and the alkylolamines are present in the fluid in respective amounts such that, at 25° C., the alkylolamines solubilise a portion of the carboxylic acids and/or alkali metal salts sufficient to render the fluid viscoelastic, and the fluid also contains a further portion of the carboxylic acids and/or alkali metal salts thereof which form a suspension of solid particulates in the fluid; and
injecting the fluid into the well, while said further portion of the carboxylic acids and/or alkali metal salts thereof is present as a suspension of solid particulates in the fluid;
such that said further portion dissolves and causes an increase in viscosity upon exposure to higher temperatures below ground.

2. A method according to claim 1, wherein $R_1$ is saturated.

3. A method according to claim 1, wherein $R_1$ is an unbranched straight chain.

4. A method according to claim 1 wherein the or each of the carboxylic acids and/or alkali metal salts has a Krafft temperature of at least 25° C.

5. A method according to claim 1, wherein the one or more carboxylic acids and/or alkali metal salts have an iodine value of 40 or less.

6. A method according to claim 1, wherein the or each alkylolamine has the formula $R_2R_3R_4N$ or $R_5R_6NR_9NR_7R_8$, where:
at least one of $R_2$, $R_3$ and $R_4$, at least one of $R_5$ and $R_6$ and at least one of $R_7$ and $R_8$ is an optionally substituted aliphatic alkylol group and the others of $R_2$, $R_3$, $R_4$, $R_5$, $R_6$, $R_7$ and $R_8$ are optionally substituted aliphatic alkyl groups or hydrogen, and
$R_9$ is a covalent bond, an optionally substituted $-CH_2-$ group, or an optionally substituted $-CH_2-CH_2-$ group.

7. A method according to claim 6, wherein each of $R_2$, $R_3$, $R_4$, $R_5$, $R_6$, $R_7$ and $R_8$ has up to four carbon atoms.

8. A method according to claim 1, wherein the fluid has a maximum viscosity in a temperature range of from 50° C. to 80° C.

9. The method of claim 1 wherein the treatment is a hydraulic fracturing treatment of the well.

10. The method of claim 1 wherein the treatment is to control water loss.

11. The method of claim 1 wherein the treatment is to place a scale dissolver in the well.

12. A method according to claim 1 wherein the fluid contains one or more water-soluble inorganic alkali metal salts selected from the group consisting of sodium hydroxide, sodium carbonate, potassium hydroxide and potassium carbonate.

* * * * *